United States Patent
Villeneuve

(10) Patent No.: US 8,689,946 B2
(45) Date of Patent: Apr. 8, 2014

(54) DEVICE FOR BLOCKING THE OUTPUT SHAFT OF THE ENGINE OF AN AUTOMOBILE

(75) Inventor: Arnaud Villeneuve, Vernouillet (FR)

(73) Assignee: Renault S.A.S., Boulogne-Billancourt (FR)

( * ) Notice: Subject to any disclaimer, the term of this patent is extended or adjusted under 35 U.S.C. 154(b) by 515 days.

(21) Appl. No.: 13/056,241

(22) PCT Filed: Jul. 3, 2009

(86) PCT No.: PCT/FR2009/051298
§ 371 (c)(1),
(2), (4) Date: Apr. 21, 2011

(87) PCT Pub. No.: WO2010/012923
PCT Pub. Date: Feb. 4, 2010

(65) Prior Publication Data
US 2011/0186400 A1    Aug. 4, 2011

(30) Foreign Application Priority Data
Jul. 28, 2008  (FR) ..................................... 08 55177

(51) Int. Cl.
*F16H 63/48* (2006.01)
*B60T 1/00* (2006.01)

(52) U.S. Cl.
USPC ............................. 188/69; 192/219.5; 310/93

(58) Field of Classification Search
USPC ....... 310/75 R, 77, 92, 93, 96, 99; 192/219.5; 188/31, 69; 74/473.21, 473.24, 530; 477/20, 29, 901
See application file for complete search history.

(56) References Cited

U.S. PATENT DOCUMENTS

| | | | | |
|---|---|---|---|---|
| 3,690,416 A | * | 9/1972 | Yamada et al. | 188/69 |
| 3,703,941 A | * | 11/1972 | Ohie et al. | 188/31 |
| 5,269,195 A | * | 12/1993 | Kitagawara | 74/411.5 |
| 6,125,983 A | * | 10/2000 | Reed et al. | 192/219.5 |
| 6,467,600 B2 | * | 10/2002 | Lee | 192/219.5 |
| 2001/0042669 A1 | * | 11/2001 | Arakawa | 192/219.5 |
| 2002/0092710 A1 | * | 7/2002 | Oppitz et al. | 188/69 |
| 2004/0237694 A1 | * | 12/2004 | Lindenschmidt et al. | 74/473.21 |
| 2008/0000315 A1 | * | 1/2008 | Reichert et al. | 74/473.24 |
| 2010/0108460 A1 | * | 5/2010 | Nakamura et al. | 192/219.5 |

FOREIGN PATENT DOCUMENTS

| | | |
|---|---|---|
| JP | 01 087068 | 6/1989 |
| JP | 09 298840 | 11/1997 |
| JP | 10 100872 | 4/1998 |
| JP | 10 175524 | 6/1998 |
| JP | 2000 291797 | 10/2000 |

* cited by examiner

*Primary Examiner* — Tran Nguyen
(74) *Attorney, Agent, or Firm* — Oblon, Spivak, McClelland, Maier & Neustadt, L.L.P.

(57) ABSTRACT

A system for blocking an output shaft of the engine of an automobile, of a type that includes a toothed wheel coaxially mounted on the shaft, and a first finger mobile between a shaft releasing position and a shaft blocking position in which the first finger is engaged in a gap formed between two teeth of the wheel. The system includes an alignment mechanism capable of aligning a gap between two teeth of the wheel and the first mobile finger, and the first mobile finger is configured to be inserted into the gap without any substantial circumferential clearance.

9 Claims, 4 Drawing Sheets

DEVICE FOR BLOCKING THE OUTPUT SHAFT OF THE ENGINE OF AN AUTOMOBILE

FIELD OF THE INVENTION

The present invention relates to the field of motor vehicles and more particularly to the immobilization of a vehicle by locking the output shaft of the motor fitted to the latter.

PRIOR ART

The locking of the output shaft of a heat engine of a motor vehicle is usually used in an automatic transmission to immobilize the vehicle. To do this, the driver engages a position called the "parking brake" position of the automatic gearbox. A finger then engages between two teeth of a gearwheel, called the "parking gearwheel", mounted coaxially on the output shaft in order to immobilize the latter.

For safety reasons, the engagement of this finger must be able to be carried out when the vehicle is running at a nonzero speed close to 5 km/h. For such an engagement at a nonzero speed to be possible, the width of the finger is substantially less than that of the spaces between two teeth of the parking gearwheel. Thus, once the finger is engaged in the parking gearwheel, there is a circumferential clearance freeing the gearwheel, and therefore the output shaft of the engine, to turn a few degrees.

However certain applications, for safety reasons, require the output shaft of the engine to be completely immobilized without it being able to make a rotation when the finger is engaged.

For example, in the context of an electric vehicle the motor of which can be of the synchronous or asynchronous type, the inventors have discovered that it is possible to rapidly recharge the array of accumulators of the vehicle by directly powering electrically the windings of the stator of the motor, which then play the role of inductive components. The stator is in effect connected to the output of an inverter generating an alternating electric power supply for the stator from the direct voltage delivered as an input by the accumulator array. As is known per se, an inverter is a reversible device which delivers at its input a rectified voltage when its output is powered with alternating-current voltage. In other words, an inverter operating so as to deliver a rectified voltage at its input is a rectifier. By electrically powering the stator windings, a recharging of the accumulator array is then achieved via the inverter.

However, to use such a recharging of the accumulator array, it is necessary to completely lock the rotor in order to immobilize the vehicle. Specifically, the flow of a current in the stator windings generates a motor torque since the rotor tends to align its magnetic field on the magnetic field of the stator caused by the flow of the current (whether it be by phenomena of reluctance in a rotor of a synchronous motor with separate excitation from which the power supply of the rotor has been disconnected, simply by the presence of the permanent magnets on the rotor of a conventional synchronous motor with permanent magnets, or else by the currents induced in the rotor in the case of an asynchronous motor). Because of the multiplying factor of the transmission system, the motor torque delivered to the wheels of the vehicle is considerable. Consequently, the slightest movement of the rotor will result in generating a torque at the wheels in the same direction causing the vehicle to move. In extreme cases, an overspeeding of the electric motor by coupling of the rotor and stator magnetic fields may cause the unintended starting of the vehicle.

However, the locking of the rotor, which forms the output shaft of the motor, by means of a finger and of a parking gearwheel as described above is not sufficient to provide optimum safety because of the existing circumferential clearance necessary for the correct operation of the parking brake. Specifically, irrespective of the type of electric power of the stator windings, there is an alternating component in the power supply which has the effect of causing a back-and-forth movement of the rotor, each phase of this back-and-forth movement terminating in a violent abutting of the finger on the side of a tooth of the parking gearwheel. Not only do these violent buttings weaken the teeth of the parking gearwheel and the finger, involving their destruction after a short while, but additionally these vibrating phenomena are propagated throughout the transmission system also weakening the latter and inducing a back-and-forth movement of the vehicle.

SUMMARY OF THE INVENTION

The object of the present invention is to solve the above-mentioned problem by proposing a system for locking the output shaft of a motor of a motor vehicle ensuring a complete locking of this shaft.

Accordingly, the subject of the invention is a system for locking the output shaft of a motor of a motor vehicle, of the type comprising a gearwheel mounted coaxially on said shaft and a first movable finger that can move between a position of releasing the shaft and a position of locking the latter in which the first finger is engaged in a space formed between two teeth of the gearwheel.

According to the invention, the system comprises alignment means able to align a space between two teeth of the gearwheel with the first movable finger, and the first movable finger is designed to engage substantially without circumferential clearance in said space.

In other words, the finger is designed to be inserted between two teeth of the gearwheel so that its sides rest on the sides of the teeth. Thus, the rotor has no degree of freedom in rotation. Notably, in the context of recharging an array of accumulators as described above, the back-and-forth movement is prevented.

It will quite clearly be understood that the expression "without circumferential clearance" means the absence of functional circumferential clearance to the extent that there is still a minimal circumferential clearance because of the manufacturing tolerances of the mechanical parts.

According to one embodiment of the invention, the alignment means comprise a second finger that can move between a position of releasing the shaft and a position of locking the latter in which the second finger is engaged in a space formed between two teeth of the gearwheel, the second movable finger being designed to engage with a large circumferential clearance in said space.

In other words, it is possible to add to the first finger a second finger similar to the conventional finger performing the parking brake function in vehicles with automatic transmission. This second finger is then mainly used in the context of the invention as a means for prealigning the first finger but may however retain its first function of parking brake.

"Great circumferential clearance" in this instance means a clearance the amplitude of which allows a prealignment of the shaft with the first finger for a nonzero speed of the vehicle of the order of 5 km/h.

According to one embodiment of the invention, the system comprises a button able to make a translational movement, and the first finger is able to make a rotary movement about a rotation spindle, the first finger comprising a surface forming a cam on which said button is able to push. More particularly, the second finger is able to make a rotary movement about the rotation spindle and comprises a surface forming a cam on which said button is able to push, the surfaces forming a cam of the first and of the second finger being arranged so that the surface forming a cam of the first finger is able to be engaged once the second finger is engaged in a space between two teeth of the gearwheel.

In other words, the first and the second finger engage successively between two teeth of the gearwheel, thus allowing a preliminary locking of the output shaft of the motor, including when the vehicle is moving, followed by a complete locking of the shaft.

Preferably, one amongst the first and the second finger comprises a pin able to engage in a circularly arcuate groove of the other finger. The successive engagement of the fingers is thus reinforced and the disengagement of one finger induces the disengagement of the other finger.

Preferably, the system comprises an elastomer ring between the rotation spindle of the first finger and the first finger so as to filter the vibrations generated by the reactions on the rotor.

According to a particular embodiment of the invention, the alignment means comprise control means able to control the slow rotation of the shaft.

In other words, the shaft is turned slowly in order to ensure an engagement of the first finger without circumferential clearance between two teeth of the gearwheel.

Advantageously, the present invention finds application in the context of an electric motor of the synchronous type the rotor of which forms the output spindle of the latter, notably when it involves locking the rotor for reasons of recharging the array of accumulators of the vehicle by powering the stator windings.

BRIEF DESCRIPTION OF THE FIGURES

The present invention will be better understood on reading the following description, given only as an example, and made with respect to appended FIGS 1 to 6, in which identical reference numbers designate identical or similar elements, these figures illustrating schematically a system according to the invention in various operating positions and elements for charging and powering according to an embodiment of the invention.

DETAILED DESCRIPTION OF THE INVENTION

Figure 1:
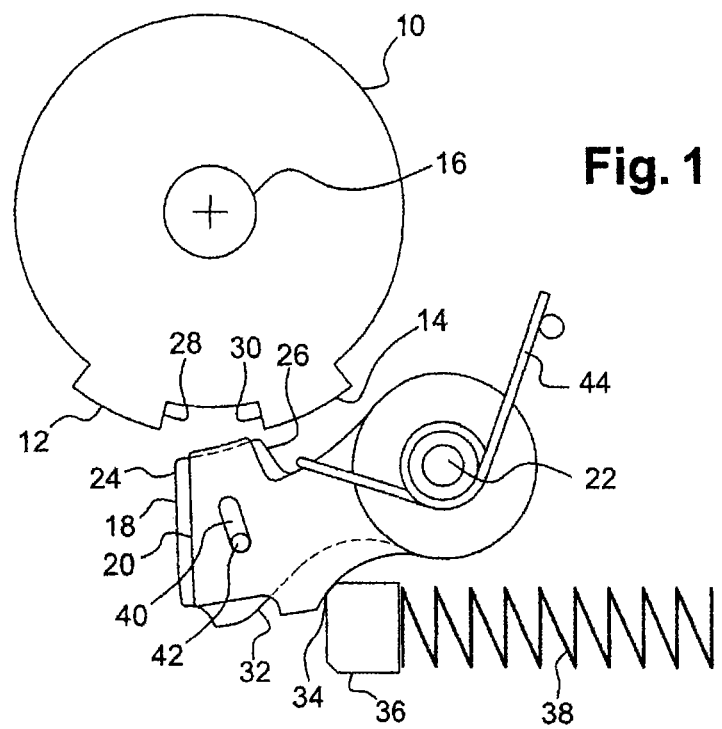

In FIGS. 1 to 5, a gearwheel 10, of which only two teeth 12, 14 are illustrated, is mounted coaxially on the output shaft 16 of a motor 60 of a motor vehicle, for example an electric motor of the synchronous type of which the rotor 62 forms the output shaft 16.

First and second fingers 18, 20 are mounted in rotation on the frame of the motor about one and the same spindle 22. The end of the first finger 18 has substantially the same shapes and dimensions as the space between the teeth 12, 14 of the gearwheel 10 in order to engage in this space substantially without circumferential clearance, the sides 24, 26 of the end of the finger 18 then being in contact with the sides 28, 30 of the teeth 12, 14 (see FIG. 5).

The end of the second finger 18 has, for its part, dimensions substantially smaller than those of the space between the teeth 12, 14 in order to be able to engage in said space including when the vehicle is running at a speed of approximately 5 km/h.

Each of the first and second fingers 18, 20 moreover comprises a surface forming a cam 32, 34 on which a button 36, made to move in translation by means of a pressure spring 38, slides to engage or disengage the fingers 18, 20 with or from the gearwheel 10.

Figure 2:
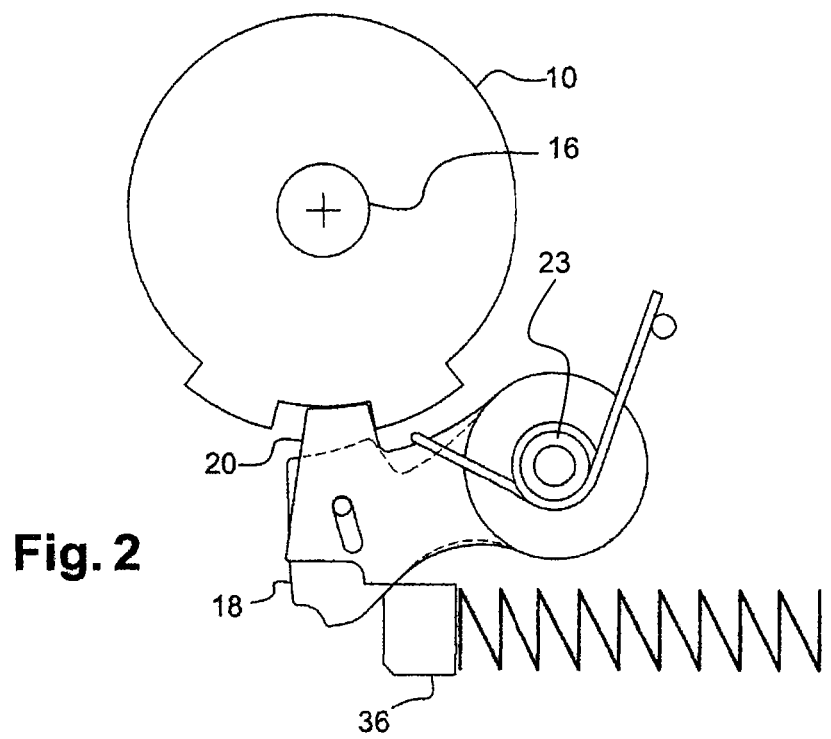

The surfaces forming a cam 32, 34 are designed so that the surface forming a cam 32 of the first finger comes into contact with the button 36 once the second finger 20 is engaged between the teeth 12, 14 (see FIG. 2).

Advantageously, the first finger 20 comprises a circularly arcuate groove 40 in which a pin 42 of the second finger is housed, the groove 40 being arranged so that once the pin 42 is in abutment at the top in the groove 40, the beginning of the surface forming a cam 32 of the first finger is in contact with the button 36 (see FIG. 2). The pin 42 thus forces the engagement of the second finger before the engagement of the first finger between the teeth 12, 14 of the gearwheel 10 and obliges a simultaneous return of the two fingers 18, 20 when they disengage from the gearwheel 10.

A return spring 44 is moreover provided and simultaneously separates the two fingers 18, 20 from the gearwheel 10 when the button 26 retracts in order to disengage the fingers 18, 20 from the gearwheel 10.

Finally, means for controlling the rotation of the output shaft of the motor 16, and therefore of the gearwheel 10, are provided in order to set the latter rotating slowly, as will be explained in greater detail below.

The engagement of the fingers 18, 20 between the teeth 12, 14 is then achieved in the following manner.

From a position in which the fingers are disengaged from the gearwheel 10 (FIG. 1), the button 36 is primed by compressing the pressure spring 38. The button 38 then acts on the surface forming a cam 34 of the second finger 20 which then pivots toward the gearwheel 10.

If the second finger 20 presses on the outer face of a tooth 12, 14, a slight movement of the vehicle has the consequence of causing the gearwheel 10 to turn, thus allowing the second finger 20, which has a large circumferential clearance, to engage between the successive teeth 12, 14 because of the continuous pressure exerted by the button 36.

Once the engagement of the second finger 20 between two teeth 12, 14 of the gearwheel 10 is effective, a prealignment of the first finger 18 with the space formed between the teeth 12, 14 is thus achieved. The button 36 then presses on the surface forming a cam 32 of the first finger and the pin 42 is in abutment at the top in the groove 40. The button 36 then continues its pressure on the surface forming a cam 32 (FIG. 2).

Figure 3:
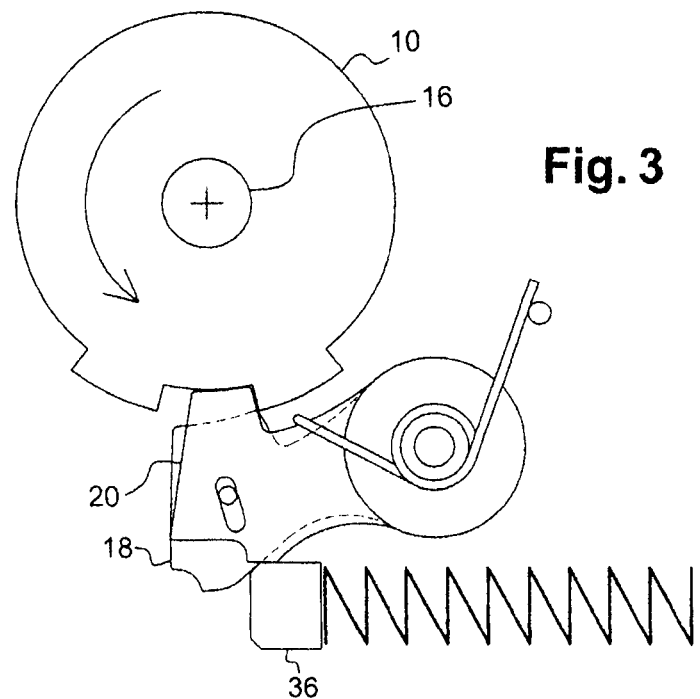
Figure 4:
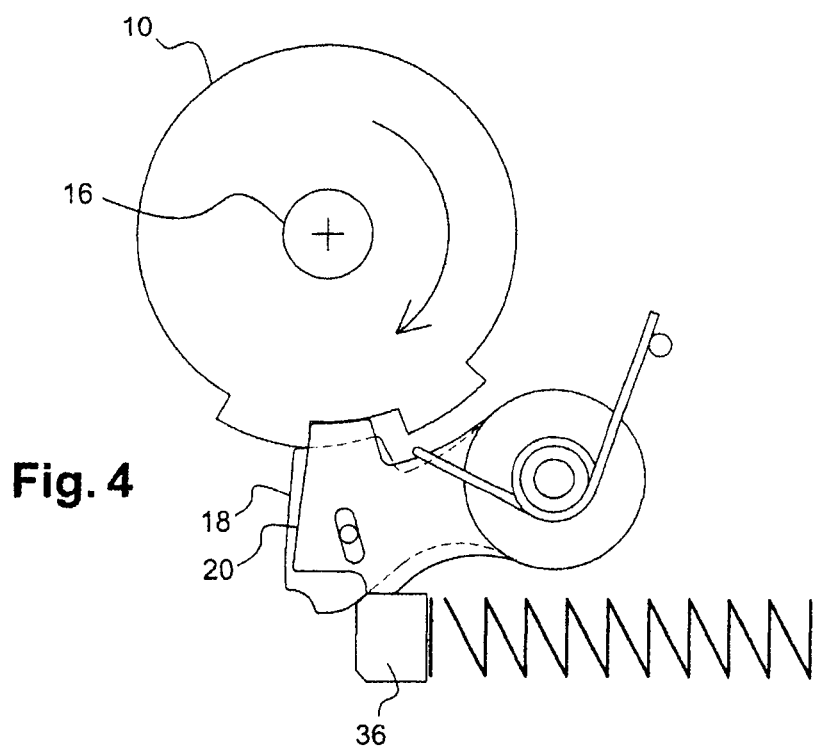

In this position, the probability of seeing the first finger 18 coming into contact with the outer surface of a tooth is high (FIGS. 3 and 4). A controlled search of the engagement of the first finger 18 is then applied by setting the output shaft 16 in slow rotation, preferably before a possible charging through a rectifier 66 of the array of accumulators 68 by powering the stator 64.

Figure 5:
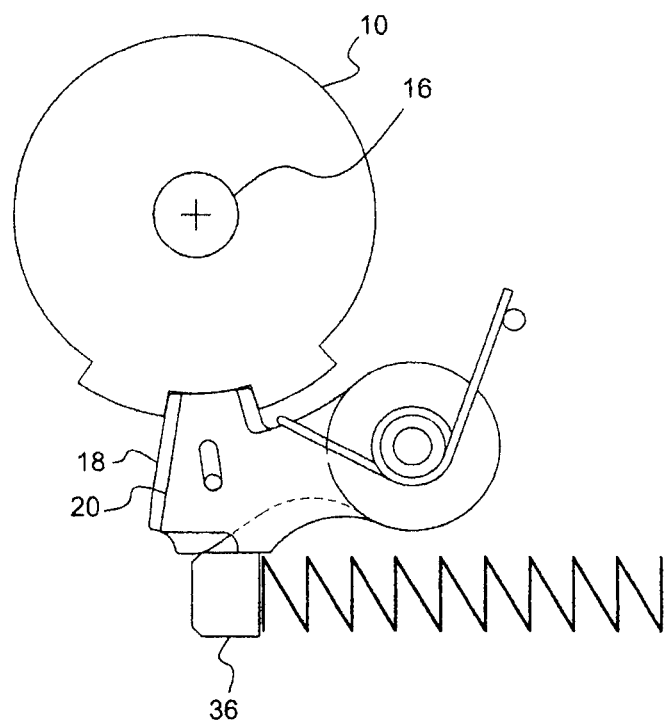
Figure 6:
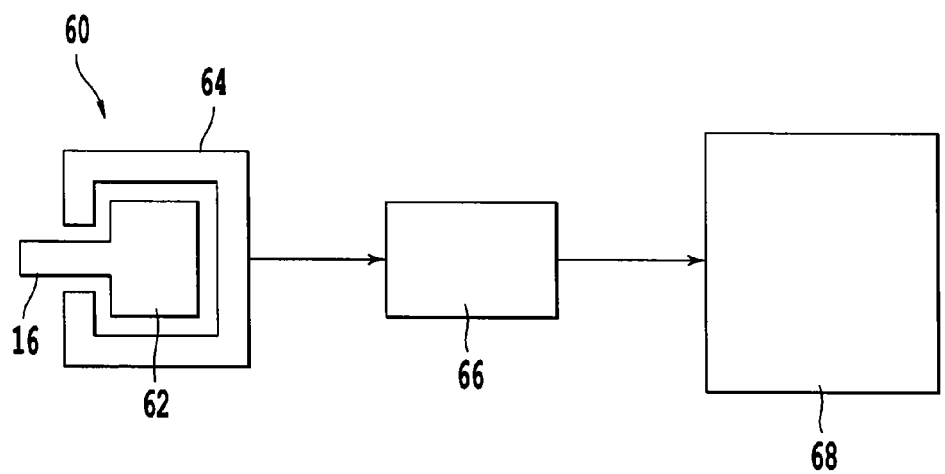

For example, when the output shaft 16 of the motor 60 consists of the rotor 62 of an electric motor, a current controlling the slow rotation of the rotor 62 is then applied. The output shaft 16 is then aligned with the first finger 18 which then engages between the teeth 12, 14 because of the pressure of the button 36 (FIG. 5). The engagement is advantageously detected by means of a stator current sensor for example. Specifically, once the first finger 18 is engaged, the latter presses on the sides of the teeth 12, 14 and forms a wedge promoting the absence of circumferential clearance. Via the continuous pressure of the button 36, the rotor 62 is then completely locked, which results in a current peak that can be detected by means of said sensor.

As a variant, when the array of accumulators 68 is charged through the rectifier 66 by the powering of the stator 64 of the electric motor, a back-and-forth movement of the rotor 62 occurs. The preliminary prealignment by means of the second finger 20 then makes it possible to engage in a single back-and-forth movement of the first finger 18 between the teeth 12, 14.

As a variant, when the torque applied to the rotor 62 is unidirectional, it is possible to design the second finger 20 so that once in abutment on a tooth, a rotation of the rotor 62 in the direction of the torque engages the first finger 18, as illustrated for example in FIG. 4.

Although there has been described an application to the locking of a rotor forming an output shaft of an electric motor of a motor vehicle, the present invention advantageously finds application in the locking of an output shaft of a heat engine. In this type of application, a simple movement of the vehicle allows the first finger to be engaged when the second finger is engaged.

Another application of such a system can be directed toward any transmission shaft using epicyclic gear trains to produce discrete (automatic gearboxes) or infinitely variable reduction ratios.

The present invention may also be improved by the addition of an elastomer ring 23 between the spindle 22 and the first finger 18 designed to filter possible vibrations generated by the reactions on the rotor 62.

The invention claimed is:

1. A system for locking an output shaft of a motor of a motor vehicle including a gearwheel mounted coaxially on the output shaft, the system comprising:
a first movable finger that can move between a position of releasing the output shaft and a position of locking the output shaft in which the first finger is engaged in a recess defined between two teeth of the gearwheel and
alignment means to align the recess between the two teeth of the gearwheel with the first movable finger,
wherein the first movable finger is configured to engage substantially without circumferential clearance in the recess.

2. The system as claimed in claim 1, wherein the alignment means comprises a second finger that can move between the position of releasing the output shaft and the position of locking the output shaft in which the second finger is engaged in the recess defined between the two teeth of the gearwheel, the second movable finger configured to engage with a circumferential clearance in the recess.

3. The system as claimed in claim 1, further comprising a button configured to make a translational movement, and wherein the first finger is configured to make a rotary movement about a rotation spindle, the first finger comprising a surface forming a cam on which the button is configured to push.

4. The system as claimed in claim 2, wherein the second finger is configured to make a rotary movement about a rotation spindle and comprises a surface forming a cam on which the button is configured to push, the surfaces forming a cam of the first and of the second finger configured so the surface forming a cam of the first finger is configured to be engaged once the second finger is engaged in the recess between the two teeth of the gearwheel.

5. The system as claimed in claim 4, wherein one of the first and the second finger comprises a pin configured to engage in a circularly arcuate groove of the other finger.

6. The system as claimed in claim 3, further comprising an elastomer ring between the rotation spindle and the first finger.

7. The system as claimed in claim 1, wherein the alignment means comprises control means to control slow rotation of the output shaft.

8. The system as claimed in claim 1, wherein the motor is an electric motor of synchronous type, a rotor of the motor forming the output shaft of the motor.

9. The system as claimed in claim 8, wherein a stator of the electric motor is configured to be powered electrically to recharge, through a rectifier, an onboard array of accumulators in the vehicle.

* * * * *